United States Patent [19]

Gotoh

[11] Patent Number: 4,635,244

[45] Date of Patent: Jan. 6, 1987

[54] OPTICAL BEAM SHAPING SYSTEM

[75] Inventor: Hiroshi Gotoh, Kawasaki, Japan

[73] Assignee: Ricoh Company, Ltd., Tokyo, Japan

[21] Appl. No.: 752,356

[22] Filed: Jul. 5, 1985

[30] Foreign Application Priority Data

Jul. 5, 1984 [JP] Japan .................................. 59-139458

[51] Int. Cl.[4] ............................. G11B 7/00; G02B 3/06
[52] U.S. Cl. ..................................... 369/112; 350/402;
350/433; 369/121
[58] Field of Search ................ 369/109, 110, 111, 112,
369/121; 350/433, 402

[56] References Cited

U.S. PATENT DOCUMENTS 4,253,735  3/1981  Kawamura et al. .............. 350/433 X
4,318,594  3/1982  Hanada ................................ 350/433
4,564,931  1/1986  O'Hara et al. ....................... 369/110

Primary Examiner—Aristotelis M. Psitos
Attorney, Agent, or Firm—Cooper, Dunham, Griffin & Moran

[57] ABSTRACT

An optical system includes a semiconductor laser for emitting a laser beam, a coupling lens for converting the laser beam a parallel beam, an optical beam shaping system for increasing the diameter of the parallel beam in a direction in which the semiconductor laser has a smaller far field pattern, and an objective lens for focusing a beam shaped by the optical beam shaping system into a spot. To make the spot substantially circular in shape and increase the light utilization efficiency, the magnification of the optical beam shaping system in a direction parallel to the junction plane of the semiconductor laser is selected to fall in a certain range.

4 Claims, 9 Drawing Figures $$P = \frac{M \cdot fc \cdot \sin(\theta_{\!/\!/}/2)}{fo \cdot NAo}$$

OPTICAL BEAM SHAPING SYSTEM

BACKGROUND OF THE INVENTION

The present invention relates to an optical beam shaping system, and more particularly to an optical beam shaping system for use in an optical signal pickup device for radiating a laser beam spot onto an optical information storage disk to record signals on and reproduce signals from the optical information storage disk.

Conventional optical beam shaping systems employed in optical signal pickup devices have proven unsatisfactory in that they lower the light utilization efficiency which is the ratio of the power of the beam emitted from the objective lens to the power of the beam emitted from the semiconductor laser in the optical signal pickup devices. The semiconductor laser has therefore been required to produce a high laser output, and has been costly to manufacture.

SUMMARY OF THE INVENTION

It is an object of the present invention to provide an optical beam shaping system in an optical signal pickup device for radiating a substantially circular beam spot onto a desired track on an optical information storage disk without irradiating adjacent tracks, to thereby increase the reproduction level of a track signal for stablizing the track signal and also to increase the light utilization efficiency.

According to the present invention, the magnification of an optical beam shaping system disposed in an optical system having a semiconductor laser, a coupling lens, and an objective lens is selected to fall in the following range:

$$0.55 \leq \frac{M \cdot fc \cdot \sin(\theta_{\parallel}/2)}{fo \cdot NAo} \leq 0.8 \quad (7)$$

where
- M: magnification of the optical beam shaping system;
- fc: focal length of the coupling lens;
- $\theta_{\parallel}$: divergent angle of the laser beam in a direction parallel to the junction plane of the semiconductor laser;
- fo: focal length of the objective lens; and
- NAo: numerical aperture of the objective lens.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 2:
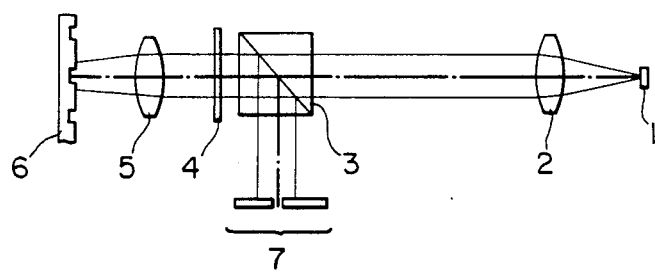
FIG. 2 is a schematic view of an optical pickup device incorporating no optical beam shaping system.

FIG. 2 shows an optical signal pickup device in which a laser beam emitted from a semiconductor laser 1 is converted by a coupling lens 2 comprising a convex lens to a parallel beam which is passed through a polarization beam splitter 3 and a quarter-wave plate 4 and focused by an objective lens 5 onto an optical information storage disk 6 as a small spot.

The beam reflected from the optical information storage disk 6 travels through the objective lens 5 and the quarter-wave plate 4 and is then directed by the polarization beam splitter 3 toward a track-detecting dual-sensor element 7.

Figure 3:
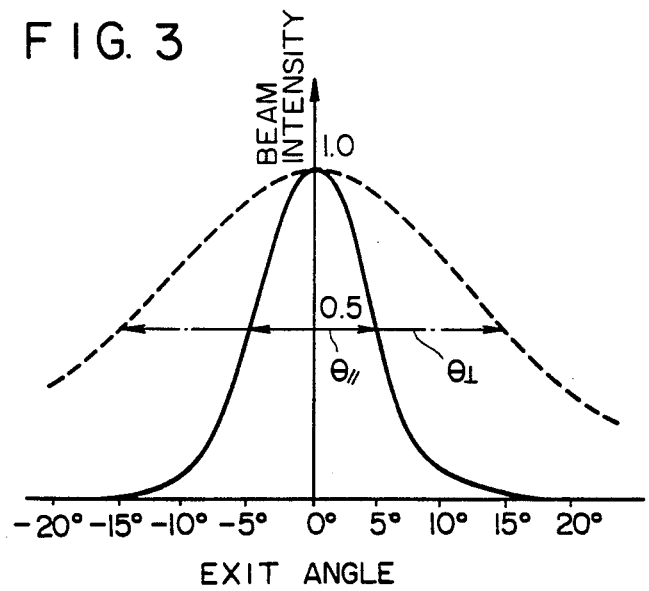
FIG. 3 is a diagram showing distribution patterns of the laser beam emitted from a semiconductor laser.
Figure 4:
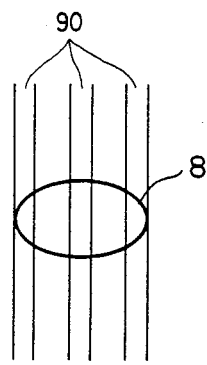
FIG. 4 is a diagram illustrative of the manner in which an elliptical spot is radiated over a plurality of tracks of an optical information storage disk.

The light emitted from the semiconductor laser 1 has an anisotropic distribution pattern. More specifically, the emitted light has different intensities in directions parallel and perpendicular to the plane of junction of the semiconductor laser as shown in FIG. 3. Typically, the half-width of an exit angle for a far field pattern is $\theta_{\parallel} = 10°$ in the direction ($\parallel$) parallel to the junction plane of the semiconductor laser 1, and $\theta_{\perp} = 30°$ in the direction ($\perp$) perpendicular to the junction plane.

Where the anistotropic laser beam is converted by the coupling lens 2 and focused by the objective lens 5, the laser spot formed on the storage disk 6 is elliptical in shape. When such an elliptical spot 8 is radiated on the optical information storage disk 6, the spot 8 spans a plurality of tracks 90, as shown in FIG. 4, and a resulting track signal has a reduced level.

There have been attempts to employ an optical beam shaping system for enlarging an incident beam on an objective lens in a certain direction to enable the objective lens to emit a beam spot of a substantially circular cross section.

Figure 5:
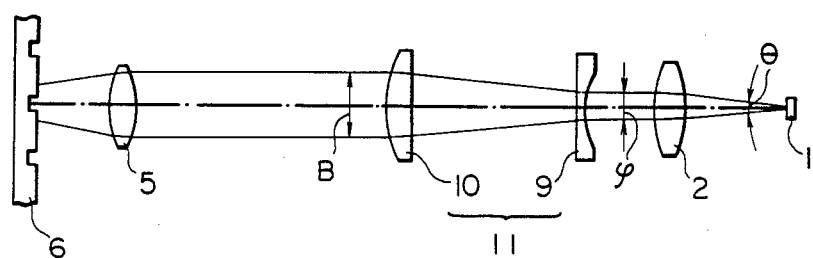
FIG. 5 is a schematic view of an optical signal pickup device in which an optical beam shaping system of the present invention is incorporated, the view showing an optical path pattern in a direction parallel to the junction plane of a semiconductor laser.
Figure 6:
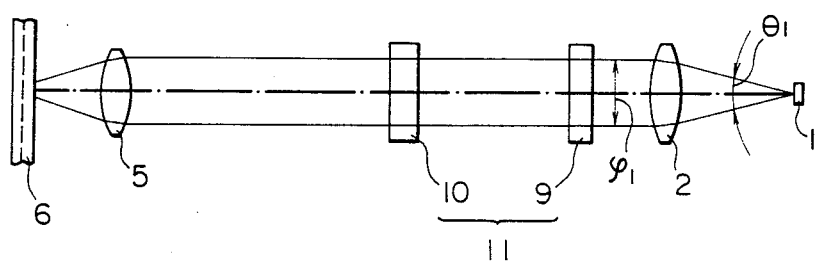
FIG. 6 is a schematic view of the optical signal pickup device of FIG. 5, the view showing an optical path pattern in a direction perpendicular to the junction plane of the semiconductor laser.

FIGS. 5 and 6 illustrate an optical beam shaping system comprising divergent and convergent cylindrical lenses. The laser beam emitted from a semiconductor laser is shaped in a direction parallel to the plane of junction of the semiconductor laser as follows: As shown in FIG. 5, the laser beam emitted from a semiconductor laser 1 is converted by a coupling lens 2 to a parallel beam which is then diverged by a divergent cylindrical lens 9. The diverged beam is converted by a convergent cylindrical lens 10 to a parallel beam which is focused by an objective lens 5 as a beam spot onto an optical information storage disk 6 disposed in confronting relation to the objective lens 5. The divergent and convergent cylindrical lenses 9, 10 closer to the coupling lens 2 and the objective lens 5, respectively, jointly constitute an optical beam shaping system 11. The optical beam shaping system 11 has no power in a direction perpendicular to the junction plane of the semicondcutor laser 1. In such a direction, therefore, the laser beam generated from the semiconductor laser 1 is converted by the coupling lens 2 to a parallel beam which is then focused by the objective lens 5 on the optical information storage disk 6.

In FIG. 5, the laser beam leaving from the coupling lens 2 in the direction parallel to the junction plane of the semiconductor laser 1 has a diameter $\phi//$ given as follows:

$$\phi// = 2fc \cdot \sin(\theta///2) \qquad (1)$$

where fc is the focal length of the coupling lens 2.

In FIG. 6, the laser beam leaving from the coupling lens 2 in the direction normal to the junction plane of the semiconductor laser 1 has a diameter $\phi\perp$ given as follows:

$$\phi\perp = 2fc \cdot \sin(\theta\perp/2) \qquad (2)$$

In FIG. 5, the laser beam leaving from the optical beam shaping system 11 in the direction parallel to the junction plane of the semiconductor laser 1 has a diameter $B//$ expressed as follows:

$$B// = M \cdot \phi// = 2 \cdot M \cdot fc \cdot \sin(\theta///2) \qquad (3)$$

where M is the magnification of the optical beam shaping system 11.

In FIG. 6, the diameter of the laser beam leaving from the optical beam shaping system 11 in the direction normal to the junction plane of the semiconductor laser 1 is equal to $\phi\perp$ since the optical beam shaping system 11 has no power in that direction.

Heretofore, the laser beam leaving from the optical beam shaping system 11 has been substantially circular in cross section. With such a circular beam cross section, the beams right after they are shaped in the directions parallel and normal to the junction plane of the semiconductor laser 1 have had diameters $B// = \phi\perp$. Hence, $$2 \cdot M \cdot fc \cdot \sin(\theta///2) = 2 \cdot fc \cdot \sin(\theta\perp/2)$$

Therefore, the magnification has been selected as follows:

$$M = \sin(\theta\perp/2)/\sin(\theta///2) \qquad (4)$$

For a typical far field pattern, $\theta// = 10°$, $\theta\perp = 30°$, and $M = 3.0$.

If the beam as shaped by the optical beam shaping system 11 is magnified three times, then the beam is spread until finally its diameter is larger than the effective diameter of the objective lens 5. As a consequence, the beam is subject to vignetting, and the light utilization efficiency which is the ratio of the power of the beam emitted from the objective lens to the power of the beam emitted from the semiconductor laser 1 is reduced. The semiconductor laser 1 has therefore been required to produce a high laser output, and has been costly to manufacture.

The principles of the present invention will be described in detail.

In the optical systems shown in FIGS. 2, 5 and 6, the spot diameter on the optical information storage disk 6 remains substantially constant if the diameter of the beam incident on the optical lens 5 is in excess of a certain value. By subjecting the beam to vignetting with the effective diameter of the objective lens 5, the incident beam approaches a plane wave, and the spot diameter approaches a constant value given by the diffraction limitation. More specifically, when the vignetting of the beam by the objective lens 5 is larger than a certain range, the spot diameter becomes substantially constant, and hence the reproduced track signal becomes stable.

Figure 1A:
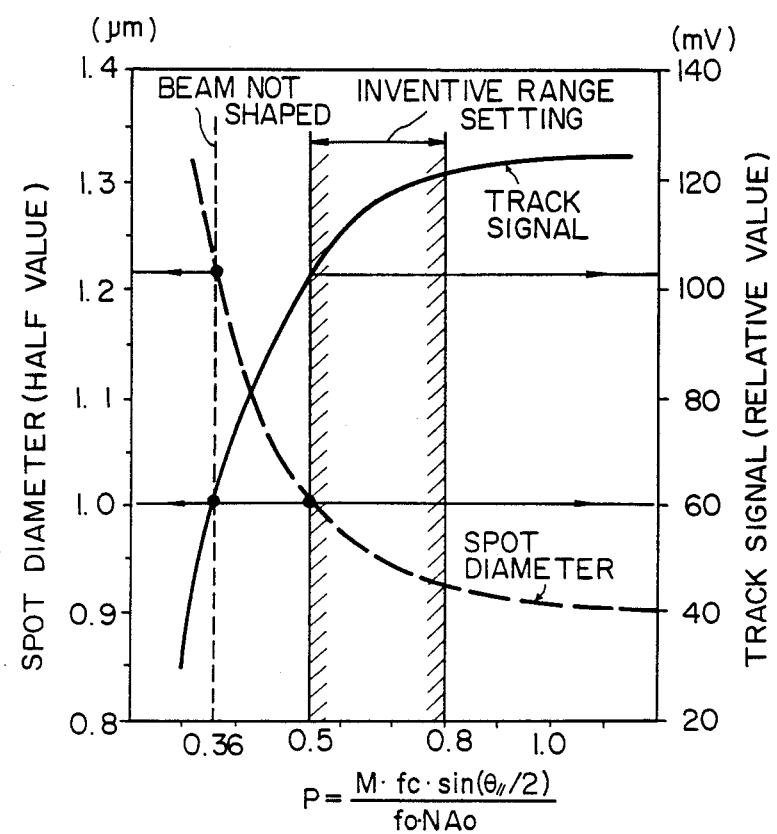
FIGS. 1(a) and 1(b) are graphs showing the characteristics of an optical signal pickup device as a beam is subject to varying vignetting by an optical lens.
Figure 1B:
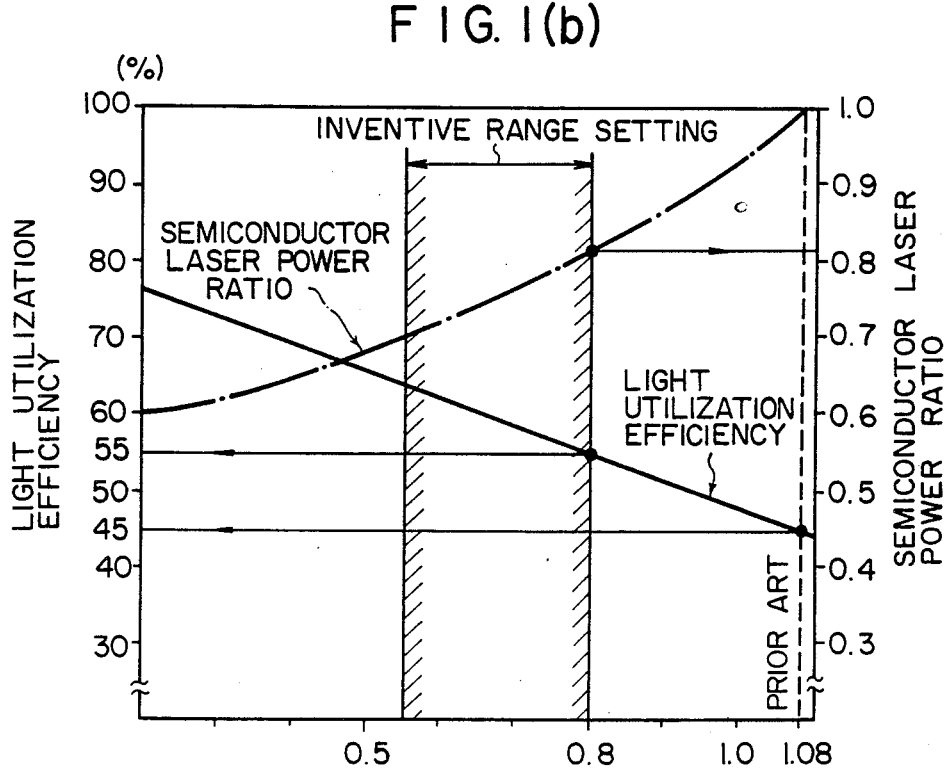

The above phenomenon is illustrated in FIGS. 1(a) and 1(b). In FIG. 1(a), the horizontal axis represents the rate of vignetting P of the beam by the objective lens, and the vertical axis the spot diameter and the track signal. FIG. 1(a) shows a characteristic curve indicating the spot diameter with the broken line and a characteristic curve indicating the track signal with the solid line.

The rate of vignetting P will be described with reference to FIG. 7 which shows an optical system equivalent to that of FIG. 5.

The effective diameter $\phi$, the focal length fo, and the numerical aperture NAo of the objective lens 5 have the following relationship:

$$\phi = 2 \cdot fo \cdot NAo \qquad (5)$$

The rate of vignetting P is given by:

$$P = \frac{B\|}{\phi} = \frac{M \cdot fc \cdot \sin(\theta\|/2)}{fo \cdot NAo} \qquad (6)$$

Figure 7:
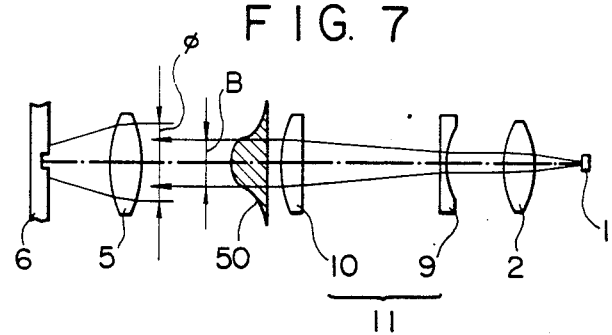
FIG. 7 is a schematic view explanatory of the effective diameter $\phi$ of the objective lens and the diameter $B_{\parallel}$ of the beam in the direction parallel to the junction plane of the semiconductor laser in the optical signal pickup device illustrated in FIG. 5.

Designated in FIG. 7 at 50 is a light intensity distribution pattern.

According to the graph of FIG. 1(a), when the numerical aperture NAo is 0.5, the spot diameter has a minimum value of about 0.9 $\mu$m. The spot, if its diameter is smaller than 1.0 $\mu$m which is about 10% greater than the above minimum value, can be regarded as being substantially circular. Therefore, the lower limit of a range of $P > 0.55$ may be regarded as a limit above which no crosstalk is generated.

If the beam were not shaped at $\theta// = 10°$ in the optical system shown in FIG. 5, for example, P would be 0.36 when fc = 9 mm, fo = 4.35 mm, and NAo = 0.5, with the results that the corresponding spot diameter would be about 1.2 $\mu$m and the track signal would be 60 mV.

If P is 0.55 as selected in the range of the present invention, then the spot is substantially circular with its diameter being about 1.0 $\mu$m, and a track signal of about 100 mV is produced. Therefore, the beam shaping operation has a sufficiently effective.

The range of P according to the present invention has an upper limit which is selected for the reasons that will be described with reference to FIG. 1(b). FIG. 1(b) shows the relationships between the rate of vignetting P, the light utilization efficiency, and the power ratio of the semiconductor laser. The power ratio of the semiconductor laser is selected to be 1 as the lower power limit necessary for recording signals when P = 1.08 (M = 3.0 in the conventional design). When P = 0.8, the light utilization efficiency is 55% which is 10% greater than the light utilization efficiency 45% at the time of P = 1.08. The power ratio of the semiconductor laser at P = 0.8 may be about 30% smaller than that of the semiconductor laser at P = 1.08.

Therefore, by selecting the magnification of the optical beam shaping system in the direction parallel to the junction plane of the semiconductor laser to fall in the following range:

$$0.55 \leq \frac{M \cdot fc \cdot \sin(\theta_{||}/2)}{fo \cdot NAo} \leq 0.8 \quad (7)$$

Figure 8:
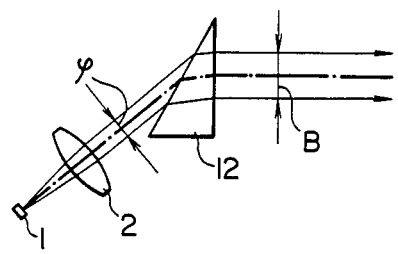
FIG. 8 is a schematic view showing an optical path pattern formed by an optical beam shaping system comprising a prism.

The present invention is not limited to an optical beam shaping system comprising cylindrical lenses, but may be incorporated in an optical beam shaping system composed of a prism 12 as shown in FIG. 8.

Although certain preferred embodiments have been shown and described, it should be understood that many changes and modifications may be made therein without departing from the scope of the appended claims.

I claim:

1. An optical system comprising a semiconductor laser for emitting a laser beam, a coupling lens for converting the laser beam a parallel beam, an optical beam shaping system for increasing the diameter of the parallel beam in a direction in which said semiconductor laser has a smaller far field pattern, and an objective lens for focusing a beam shaped by said optical beam shaping system into a spot, said optical beam shaping system having a magnification selected to fall in the following range:

$$0.55 \leq \frac{M \cdot fc \cdot \sin(\theta_{||}/2)}{fo \cdot NAo} \leq 0.8 \quad (7)$$

where
 M: magnification of the optical beam shaping system;
 fc: focal length of the coupling lens;
 $\theta_{||}$: divergent angle of the laser beam in a direction parallel to the junction plane of the semiconductor laser;
 fo: focal length of the objective lens; and
 NAo: numerical aperture of the objective lens.

2. An optical system according to claim 1, wherein said coupling lens comprises a convex lens.

3. An optical system according to claim 1, wherein said optical beam shaping system comprises a divergent cylindrical lens closer to said coupling lens and a convergent cylindrical lens closer to said objective lens.

4. An optical system according to claim 1, including an optical information storage disk disposed in confronting relation to said objective lens.

* * * * *